(12) United States Patent
Kovvali et al.

(10) Patent No.: US 6,920,113 B1
(45) Date of Patent: Jul. 19, 2005

(54) TRANSPORT OF ISOCHRONOUS AND BURSTY DATA ON A SONET RING

(75) Inventors: Surya Kumar Kovvali, Westborough, MA (US); Ramji Raghavan, Waltham, MA (US)

(73) Assignee: Telsima Inc., Santa Clara, CA (US)

( * ) Notice: Subject to any disclaimer, the term of this patent is extended or adjusted under 35 U.S.C. 154(b) by 0 days.

(21) Appl. No.: 09/536,416

(22) Filed: Mar. 28, 2000

(51) Int. Cl.[7] ............................................. H04L 12/28
(52) U.S. Cl. .................... 370/255; 370/271; 370/346; 370/350; 370/352; 370/395.1
(58) Field of Search ................. 370/255, 258, 370/271, 346, 350, 352, 395.1, 431, 395.51

(56) References Cited

U.S. PATENT DOCUMENTS

| | | | |
|---|---|---|---|
| 3,988,545 A | 10/1976 | Kuemmerle et al. | |
| 4,093,823 A | 6/1978 | Chu | |
| 4,494,232 A | 1/1985 | Dambrackas et al. | |
| 4,998,242 A | 3/1991 | Upp | |
| 5,241,543 A | 8/1993 | Amada et al. | |
| 5,257,261 A | 10/1993 | Parruck et al. | |
| 5,282,200 A * | 1/1994 | Dempsey et al. | 370/245 |
| 5,327,428 A | 7/1994 | Van As et al. | |
| 5,566,177 A | 10/1996 | Bhandari et al. | |
| 6,052,386 A | 3/1997 | Achilleoudis et al. | |
| 5,631,906 A | 5/1997 | Liu | |
| 5,648,958 A | 7/1997 | Counterman | |
| 5,867,484 A * | 2/1999 | Shaunfield | 370/395.51 |
| 5,751,720 A | 3/1999 | Uematsu et al. | |
| 6,202,082 B1 * | 3/2001 | Tomizawa et al. | 709/201 |
| 6,246,667 B1 * | 6/2001 | Ballintine et al. | 370/224 |
| 6,754,210 B1 | 6/2004 | Ofek | |
| 6,762,994 B1 | 7/2004 | Mitchell et al. | |
| 6,785,228 B1 | 8/2004 | Vandette et al. | |
| 6,785,288 B1 | 8/2004 | Enns et al. | |
| 6,798,776 B1 | 9/2004 | Cheriton et al. | |

OTHER PUBLICATIONS

International Search Report of PCT/US01/51153 (Jan. 2, 2003).
International Search Report of PCT/US01/49694 (Feb. 10, 2003).
International Search Report of PCT/US01/09723 (Mar. 27, 2001).

\* cited by examiner

*Primary Examiner*—Dang Ton
*Assistant Examiner*—Inder Pal Mehra
(74) *Attorney, Agent, or Firm*—Fish & Richardson P.C.

(57) ABSTRACT

A method and apparatus for using SONET technology to efficiently carry both data and voice traffic by Add/Drop Multiplexing of both isochronous traffic, such as voice and video, and non-isochronous traffic, such as data, in a SONET/SDH fiber-optic ring topology. A portion of a SONET/SDH frame structure (STS-1, STM-1 etc.) is shared by a number of nodes connected to an optical SONET/SDH ring (either directly or sitting behind a SONET/ADM). The inherent column structure of the SONET/SDH frame is used define dynamic channels (flexible bandwidth channels) between the nodes. Each dynamic channel can be assigned a priority and optionally a minimum bandwidth. The channel to column mapping is varied dynamically for data traffic by a centralized bandwidth manager which serves as an arbiter for requests for bandwidth. Both isochronous traffic and best effort data traffic may be carried in an STS-1 frame thereby allowing over-subscribing and statistical multiplexing of data channels over the unassigned portion of the STS-1 frame.

24 Claims, 11 Drawing Sheets

US 6,920,113 B1

TRANSPORT OF ISOCHRONOUS AND BURSTY DATA ON A SONET RING

BACKGROUND

This invention relates to data communication over a multiplexed channel.

SONET/SDH (Synchronous Optical Network/Synchronous Digital Hierarchy) standards were developed as an evolution of legacy copper based transmission equipment to serve as a next generation/broadband transport of voice traffic over fiber optic infrastructure.

The first generation of digital transmission equipment used physical layer technologies that were encompassed under three regional digital signal hierarchies. The North American hierarchy consists of DS0 (64 kb/s), DS1 (1.544 Mb/s), DS1c (3.152 Mb/s), DS2 (6.312 Mb/s), DS3 (44.736 Mb/s), DS3C (91.035 Mb/s) and DS4 (274.176 Mb/s) signals. The European hierarchy consists of E0 (64 kb/s), E1 (2.048 Mb/s), E2, E3 and E4 signals. The Japanese hierarchy is similar to the North American hierarchy with differences at the higher speeds. All of the rates and formats listed above are multiples of the basic digitized voice signal (4 kHz audio bandwidth sampled at the Nyquist rate of 8000 samples per second and encoded into an 8-bit PCM signal). In years past, the primary purpose of the digital transmission equipment was to carry digitized voice traffic multiplexed into signals at various rates defined in the hierarchies outlined above.

At the higher of the of signal rates, broadband optical fiber links are used for communication at the physical layer. The majority of this broadband optical fiber communications are based today on the SONET/SDH family of standards (SDH is essentially the international standard corresponding to SONET). The standards provide mechanisms to transport digitized voice traffic streams within higher speed SONET "pipes," which are aggregated streams of multiplexed low speed traffic. A series of Bellcore and ANSI specifications define data formats of payload containers (typically referred to as virtual tributaries, or VTs) to carry legacy traffic rates (DS1, DS1C, DS2 and DS3, of what is known as the PDH, or the Pleisochronous Digital Hierarchy) in higher speed synchronous communication on the optical links. According to the virtual tributary approach, data and voice traffic, regardless of their rates, are mapped to the strict hierarchy of virtual tributaries, which can be successively multiplexed into more aggregated streams.

Referring to FIG. 1, communication according to the SONET standard makes use of a ring architecture in which a number of communication nodes are connected by optical links to form a ring. A SONET ring 110 typically has a number of nodes each of which includes an add/drop multiplexer (ADM) 120. Each of the nodes are coupled to two neighboring node by optical paths 122. Communication passes around the ring in a series of synchronous fixed-length data frames. Each ADM 120 is configured at the time the ring is provisioned to pass a portion of the communication on the ring without modifying it, to extract (drop) a portion of the communication destined for that node, and to add outbound communication leaving the node to the optical path. The dropped and added communication passes between the ADM and local communication equipment, such as a multiplexer 130, which multiplexes a number of separate traffic streams 134. For example, the a separate communication streams 134 may be 1.5 Mb/s (DS1) data stream on which separate 64 kb/s (DS0) telephone channels that are multiplexed. The DS1 data stream is multiplexed onto the optical path and passed between particular nodes on the SONET ring. Typically, SONET ring, 110 is provisioned to provide fixed rate bidirectional communication streams, also known as virtual paths, between pairs of communication steams 134, each of which is coupled to a different ADM 120 on the ring. In operation, the virtual paths coupling different communication streams 134, including their allocated data rates, typically remains fixed for long periods of time.

A variety of types of SONET rings are used. In a UPSR (unidirectional path switched ring), all communication between nodes travels in one direction around the ring. In another type of ring, a BLSR (bi-directional line switched ring), communication travels between nodes on the ring in both directions, with two unidirectional optical links joining each pair of neighboring nodes.

The process of multiplexing standard rate data streams into higher rate streams is a basic feature of SONET communication. Multiplexed data streams passes between nodes in a SONET ring at particular data rates. Referring to FIG. 2, a hierarchy of standard rate streams and multiplexing of streams that are defined as part of the SONET standards is illustrated. At the lowest rates, a VT1.5 virtual tributary 220 supports a 1.5 Mb/s data rate. This is the data rate of a common DS1 (T1) service, and can support up to 24 separate 64 kb/s (DS0) data streams. A VT2 virtual tributary 222 supports 2 Mb/s data, and a VT6 virtual tributary 224 supports 6 Mb/s. These virtual tributaries are typically the smallest units of communication that are added or dropped at an ADM. Virtual tributaries can be combined into a: victual tributary (VT) group 230, which can consist of 4 VT1.5, 2 VT2 or 1 VT6 virtual tributaries, and entire VT groups can be added and dropped at an ADM.

In different configurations of SONET rings, communication on the optical links can be at different data rates and use various forms of multiplexing. In one mode, a series of synchronous frames each include a Synchronous Payload Envelop (SPE) 240, which can be used to carry 45 Mb/s data between the SONET nodes. The SPE can carry a raw data rate of 45 Mb/s or can be used to carry seven VT groups. An SPE is in turn; carried in an STS-1 frame 250, which adds control and overhead data to the SPE for transmission. The STS-1 frame can be optically encoded as an OC-1 signal 280 for transmission over an optical link, or multiplexed three STS-1 frames to an STS-3 frame 260 and optically encoded as an OC-3 signal for transmission over a higher capacity optical link. An STS-3 frame can also carry a concatenated STS3c payload envelope 252, which is used to carry a 140 Mb/s signal. The STS-3 frame can multiplexed still further, for instance four STS-3 frames to a STS-12 frame 270, which is in turn optically encoded as an OC-12 signal 284. Likewise, a SONET frame could be a concatenated STS-48c frame encoded as an OC48 optical signal, wherein a single SPE accounts for the entire OC48 payload.

Referring to FIG. 3, in the case of STS-1 framing, each of a sequence of STS-1 frames 310 carries an SPE 330. Each STS-1 frame is typically conceptualized as an array of 90 columns by 9 rows of 8-bit bytes. As a signal, the rows are concatenated one after another to form a linear signal. Each SPE 330 holds 87 columns by 9 rows, with the remaining 3 columns of the STS-1 frame being used for control and overhead data. In transmission, an SPE is not necessarily aligned with an STS-1 frame. Each STS-1 same has a line and section overhead section 320 that includes a pointer to the first byte of the SPE.

Each SPE 330 is 87 columns by 9 rows in size. The first column of the SPE is an STS path overhead 340. When the SPE holds seven VT groups 350, the VT groups each use 12 columns; 2 extra columns are left unused to fill the 87 column SPE. If the content of the SPE is not a set of VT groups, then the fill remaining 86 columns can be used for data.

As outlined above, each VT group 350 can multiplex one or more equal sized virtual tributaries. In FIG. 3, a VT group holding four VT1.5 virtual tributaries 360 is shown. The first byte of each virtual tributary 370 is used for control information for that virtual tributary. The content of the first byte four consecutive frames of a virtual tributary is assembled into a four-byte control quantity which is associated with the virtual tributary.

An explosion of Internet traffic and an ever increasing need to seamlessly network geographically disjoint locations has resulted in a dramatic increase in data traffic the past few years. Today, this data traffic is largely transported using the virtual tributaries of the SONET infrastructure. The volume of this data traffic now typically exceeds the volume of voice traffic.

The LAN backbone and access technologies that are used to pass data to and from the SONET infrastructure generally support different data rates than those of the PDH digital signal hierarchy described above. The technologies in use today and those emerging for the future include Ethernet (10 Mb/s), Fast Ethernet (100 Mb/s), Gigabit Ethernet (1 Gb/s), Frame Relay, ATM, DSL and Cable. The variety of rates and formats of data streams that are mapped to legacy Virtual Tributary rates can result in gross inefficiencies of "stranded" bandwidth that is left unused in a SONET Frame. In addition, the existing synchronous digital signal hierarchy was designed for static allocations of data rates over data streams between nodes and hence is not particularly flexible to deal with the bursty nature of data traffic. For example, a SONET ring may be provisioned according to the maximum data rates guaranteed between particular nodes, making it difficult to make use of unused capacity between one pair of nodes for data communication among another pair.

Some approaches to the data transport problems are based on the predominant networking protocols that are used to carry data on networks today, namely IP (Internet Protocol) and ATM (Asynchronous Transfer Mode). In particular, two types of approaches to passing data over SONET infrastructure have been proposed. A common theme in the two solutions, which are outlined below, is the retention of the ring topology of interconnection of the SONET ring, and support for redundancy and protection switching in the infrastructure.

A first approach, ATM Virtual Path (VP) Ring, is based on the Bellcore standard GR-2837-CORE. According to this standard, ATM is used as the protocol of choice to multiplex both data and voice streams in a SONET ring environment. ATM functionality is integrated into SONET transport equipment at each node. All traffic streams then pass over the SONET ring are adapted to ATM fixed length cells. The ATM cell stream is treated as a contiguous byte stream, which is treated as payload in all of a SONET SPE. ATM Virtual Paths are provisioned between various nodes on the ring to terminate different traffic streams. That is, particular data rates are allocated for communication between particular pairs of nodes in the ring. A typical ATM-based ADM has 2 logical layers: a SONET framer/demultiplexer which delivers an STS-N payload envelope, and an ATM VP multiplexer/demultiplexer which extracts appropriate Virtual Paths from the SONET payload envelope. In order to support IP-based communication over the ATM-based infrastructure, associated technologies such as LANE, MPOA, and MPLS are used.

To preserve the fixed rate, time division multiplexed (TDM) nature of SONET to transport voice, GR-2837-CORE also specifies a hybrid solution. In the hybrid approach, one or more STS-1 channels in a STS-N ring are reserved for ATM/VP Ring, and the remaining STS-1 channels used to carry traditional TDM traffic.

A second approach to passing data over SONET infrastructure is called Dynamic Packet Transfer (DPT). This approach uses IP as the basic multiplexing technology instead of ATM. Like the ATM VP Ring approach, the DTP approach assumes replacement of the existing transport infrastructure at each SONET node with IP-based routers. DPT defines a layer 2 protocol called Spatial Reuse Protocol (SRP), which is used to transport IP datagrams between nodes in a ring. SRP allows reuse of ring bandwidth across different sections of a ring of nodes. A supplementary algorithm called SRP Fairness algorithm (SRP-fa) was also defined to achieve fair sharing of bandwidth, between various nodes in a ring topology.

SUMMARY

Traditional SONET equipment has several desirable features, including interoperability and speedy fault recovery. The SONET framing structure, and the defined transport and path overhead bytes provide the basis for interoperability, and provide mechanisms for fault management and protection switching. However, the SONET framing structure, virtual tributary approach and payload mapping are not well suited to carrying data at rates that do not match the SONET signal hierarchy, or that exhibit bursty or time-varying rates.

In a general aspect, the invention provides a method and apparatus for using SONET technology to efficiently carry both data and voice traffic by Add/Drop Multiplexing of both isochronous traffic, such as voice and video, and non-isochronous traffic, such as data, in a SONET/SDH fiber-optic ring topology. A portion of a SONET/SDH frame structure (STS-1, STM-1 etc.) is shared by a number of nodes connected to an optical SONET/SDH ring (either directly or sitting behind a SONET/ADM). The inherent column structure of the SONET/SDH frame is used to define dynamic channels (flexible bandwidth channels) between the nodes. Each dynamic channel can be assigned a priority and optionally a minimum bandwidth. The channel to column mapping is varied dynamically for data traffic by a centralized bandwidth manager which serves as an arbiter for requests for bandwidth. Both isochronous traffic and best effort data traffic may be carried in an STS-1 frame thereby allowing over-subscribing and statistical multiplexing of data channels over the unassigned portion of the STS-1 frame.

In one aspect, in general, the invention is a method for communicating between multiple nodes of a communication system in which a series of fixed-length frames pass between the nodes of the system. The method includes provisioning the communication system, including allocating in each frame a fixed part. The fixed part including a first part of the frame for passing control information between the nodes and a second part for passing data streams over a plurality of dynamically allocated channels between the nodes. At a first node in the system, the method includes (1) receiving a communication request for a dynamically allocated channel between a second node and a third node including receiving request data from the second node in the first part of a received frame, (2) allocating a portion of the second part of the frames to said dynamically allocated channel, and (3) broadcasting a response to the request including transmitting control data in the first part of a frame. At the second node, the method includes (1) receiving the control data transmitted by the first node, (2) determining the portion of the second part of each of the frames that is allocated to said dynamically allocated channel, (2) sending a data stream over said dynamically allocated channel to the third node, including passing data in said portion of the second part of each of a series of frames.

The method can include one or more of the following features:

Receiving the request for the dynamically allocated channel between the second node and the third node includes receiving a request to assign a communication session for passing a data stream between the second node and the third node.

Receiving the request to assign the communication session includes receiving a priority for said communication session.

Receiving the request for the dynamically allocated channel between the second node and the third node includes receiving a request to change an allocated capacity of a communication channel previously allocated to communication between the second node and the third node.

Allocating the portion of the second part of the frames to said communication channel includes modifying allocated capacities of multiple communication channels.

The fixed part includes a third part that is allocate for fixed-rate channels between the nodes.

The third part consists of non-contiguous columns of the frame.

The communication system includes a SONET network and each frame includes a Synchronous Payload Envelope (SPE), and wherein allocating the fixed part of each frame includes allocating a portion of the SPE of each frame.

The portion of the SPE is the entire SPE, includes a virtual tributary group, or includes a virtual tributary.

Provisioning the communication system further includes allocating a portion of the SPE to conventional SONET virtual tributaries, whereby a portion of the communication capacity of the SONET network is used for conventional communication on statically allocated virtual paths.

The first part of the frame and the second part of the frame are each integral numbers of columns of the SPE.

Allocating a portion of the second part of the frames includes allocating an integral number of nine-byte columns of the SPE.

In another aspect, in general, the invention is a method for passing data between nodes of a SONET network. The method includes provisioning the SONET network, including identifying a fixed portion of synchronous frames transmitted over the SONET network for passing the data between the nodes. The fixed portion includes a first part of the frame for passing control information between the nodes and a second part for pass ing data streams over dynamically allocated channels between the nodes. The method also includes establishing multiple communication channels for passing data between the nodes and associating each communication channel with a number of terminal nodes, wherein the communication channels include a first communication channel coupling a second node to a third node. The method includes determining at a first node an allocation of a portion of the second part of the frames for each of the communication channels and then broadcasting the allocation from the first node to the other nodes including passing information in the first part of one or more frames. The method also includes, at each of the second and the third nodes, receiving control information in the first part of a sequence of frames and processing the received control information to determine the portion of a frame that is allocated to the first communication channel. The second node receives a first frame from the network, adds data for transmission to the third node into the portion of the first frame that is allocated to the first communication channel and transmits the first frame onto the network. The third node receives the first frame from the network, and extracts the data from the portion of the first frame that is allocated to the first communication channel.

The method can also include sending a request from the second node to the first node to change the allocated capacity of the first communication channel, and, at the first node, receiving the request, determining an update to the allocation of the second part of the frames for the communication channels, and broadcasting control information to the other nodes encoding the update to the allocation.

In another aspect, in general, the invention is a communication system comprising multiple nodes couples by a communication path, wherein one of the nodes is an arbiter node, and wherein each node. The system includes a framer for receiving a series of communication frames from the communication path, and for transmitting the communication frames along the communication path. The system also includes circuitry for identifying control information in each of the communication frames, circuitry for determining an allocated location and a size of a portion of each communication frame that is allocated to a selected one of the traffic streams using the identified control information, and circuitry for inserting data for the selected traffic stream into the communication frame at the determined location for the selected stream.

The system can also include circuitry for inserting a request to change the allocated size for the traffic stream in the communication frame prior to its transmission.

Aspects of the invention have several advantages, including one or more of the following.

The standard (STS-N) SONET framing structure including transport/path overhead is retained.

The hierarchical nature of Virtual Tributary mapping on to SONET STS-1 frames can be eliminated. A SONET STS-1 frame can be treated as a single monolithic frame structured into 86 columns of payload, plus 3 columns of Transport overhead (Section and Line Overhead), and 1 column of Path Overhead. The payload portion of the STS-1, frame may be apportioned to various data/voice streams, as desired. There are 260 columns of payload bandwidth available for STS-3c frames, not including the 10 columns for Section/Line/Path overhead. Similarly, there are 4160 columns available for payload in an STS-48c SPE (after subtracting the 160 columns of Transport and Path Overhead from the total of 4320 columns).

Granularity of bandwidth allocation is not limited to sizes of virtual containers, namely VT1.5 (Ti), VT2 (E1) etc. For instance, a granularity of allocation equal to 1 column of a SONET frame (64*9=576 kb/s) can be used.

Management of SONET bandwidth is not limited to static allocation. Static TDM allocation can be retained for simplicity, and to support traditional circuit switched voice streams.

Compared to the ATM VP approach, less bandwidth is lost to overhead. Each ATM cell uses a 5 byte cell header and a 48 byte cell payload (almost 10% overhead). When IP data is encapsulated, for example using LLC/SNAP headers (defined in RFC 1483) still more bandwidth is lost to overhead. In contrast, the invention can use a byte or less of overhead for each dynamic channel per STS-N frame, and the dynamic channel can be allocated multiple columns in the frame. This can amount to less than 1% overhead when STS-3c frames are used according to this invention.

In approaches in which the entire SONET frame (STS-1, or STS-3C, or STS-12C) carries ATM cells, voice and other TDM traffic need to be converted to ATM first. This requires additional circuitry. Also, packet data traffic, such as IP and Frame Relay, needs to be converted to ATM using segmentation and reassembly engines. In contrast, in this invention, TDM data can be carried using the traditional VT approach in the SONET frames without requiring any format conversion, and IP and Frame Relay data can be sent without segmentation and reassembly.

The invention provides a natural approach to internetworking using IP. Complex inter-working protocols such as LANE, MPOA supplemented by ATM protocols such as UNI signaling and ILMI are not necessary to map LAN as they are in current approaches that use ATM for all traffic.

Natural broadcast and multicast communication can be implemented by having more than two nodes share a data channel. One node can add data to the channel and multiple channels can drop data from the channel. Therefore, protocols that are designed for multi-access media such as Ethernet can be supported without the need to implement a mesh of circuits, as is necessary the ATM VP ring approach.

Statistical multiplexing and over-subscription is achieved by using a centralized bandwidth arbiter. In the ATM VP ring approach, the VPs can be configured such that the sum of PCRs (Peak Cell Rates) of all the configured VPs exceeds the link rate. However, such provisioning implemented in a ring topology has the problem that one or more up-stream devices could hog the ring bandwidth, thereby starving down-stream devices. Also the use of the best-effort traffic class could cause unfair bandwidth usage by upstream devices.

In approaches in which all traffic is carried as EP datagrams, traditional telephony, video and other non-IP data is converted into IP packets. Delay and other quality of service QOS guarantees for isochronous traffic would then have to be enforced as with the IP framework. In this invention, isochronous traffic is time division multiplexed in the SONET frames, thereby naturally supporting a guaranteed fixed data rate.

Typical SONET access/metropolitan loops have some key properties, which are different from traditional data networks. The traffic patterns are predominantly funneled from various client sites to a central office. For example, the various devices on the ring provide access to different organizations serviced by one service provider. This invention provides a natural approach to central management, and explicit access and usage control.

Other features and advantages of the invention are apparent from the following description, and from the claims.

DESCRIPTION

Figure 1:
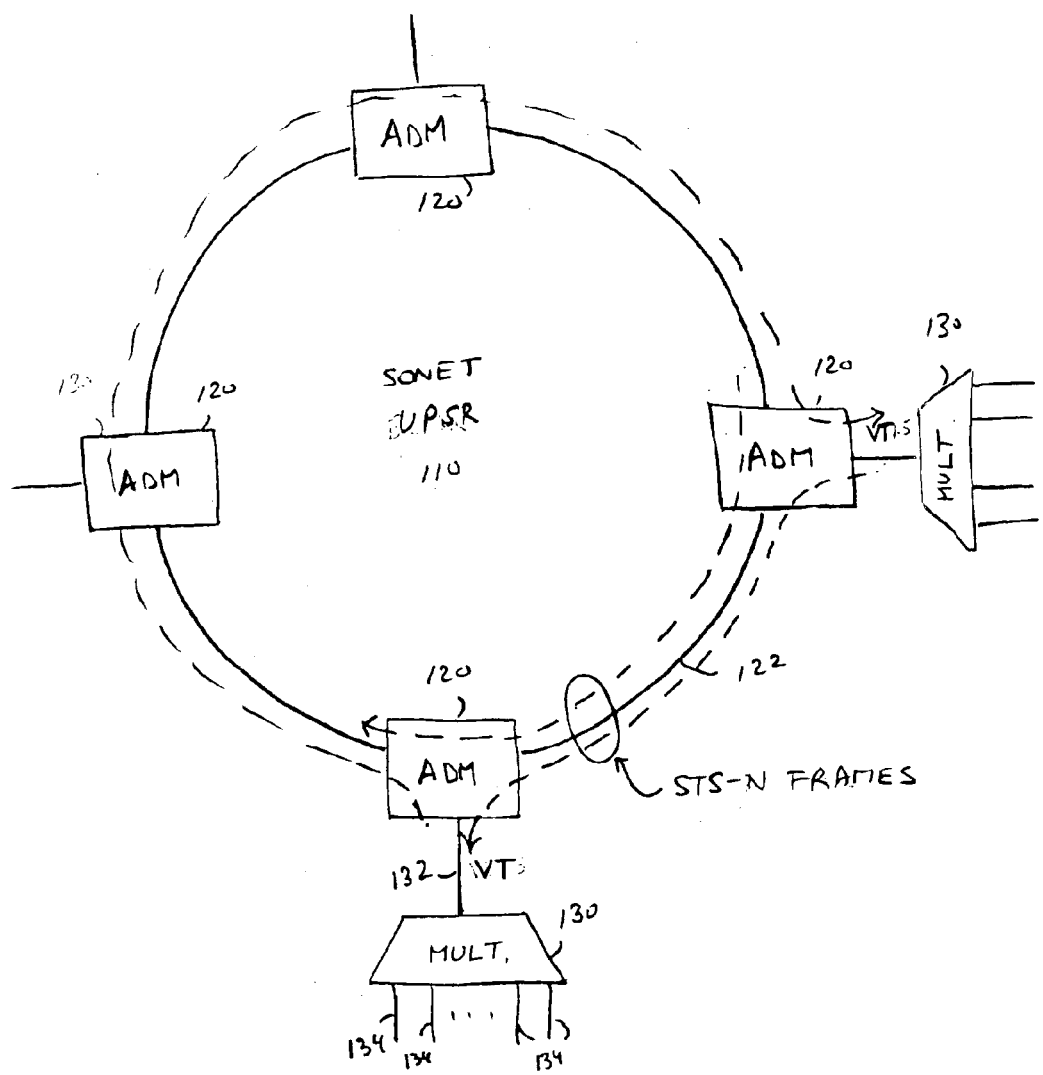
FIG. 1 is a block diagram of a SONET ring with add/drop multiplexers at nodes on the ring.
Figure 2:
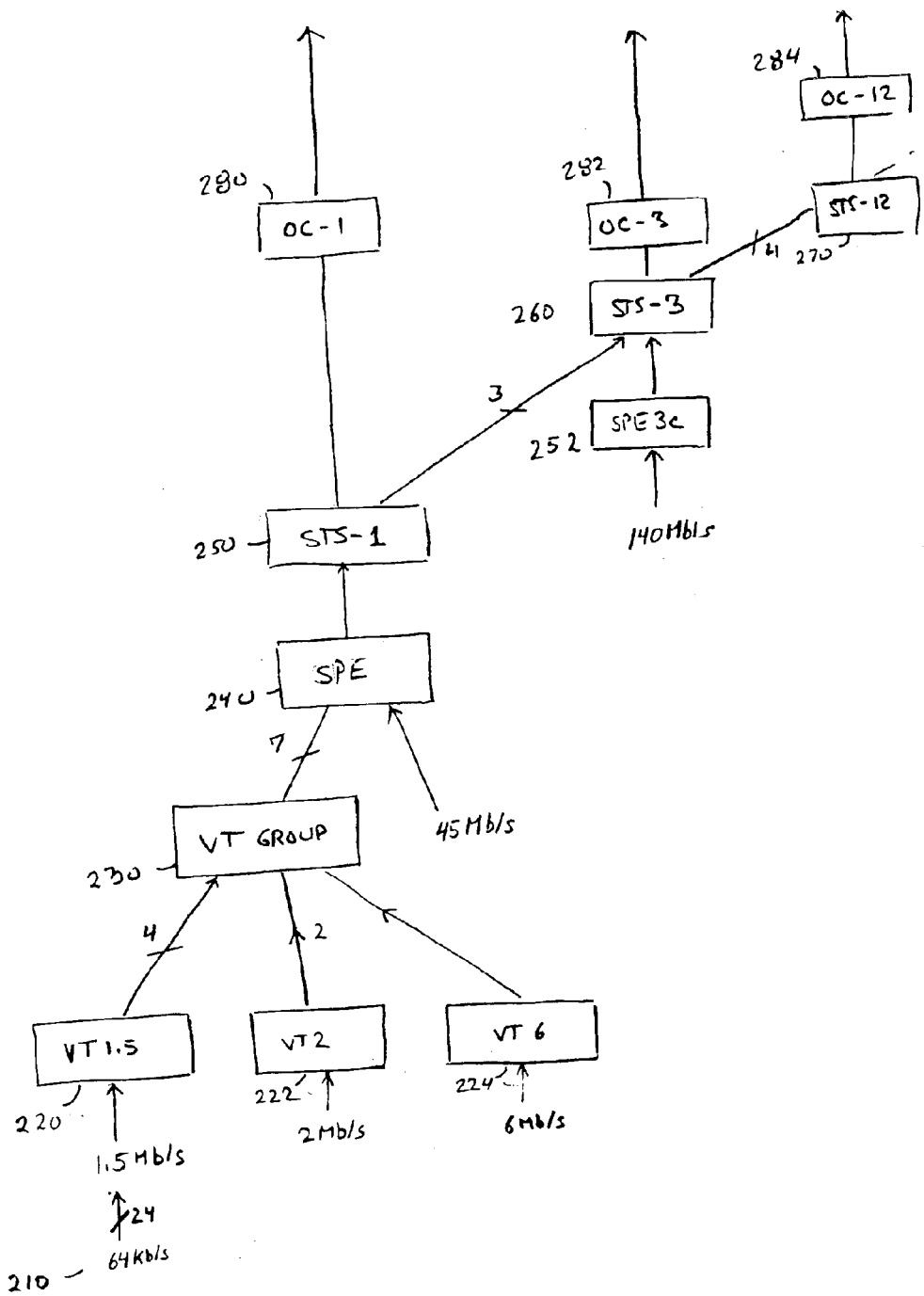
FIG. 2 is a diagram illustrating the hierarchy of SONET signals.
Figure 3:
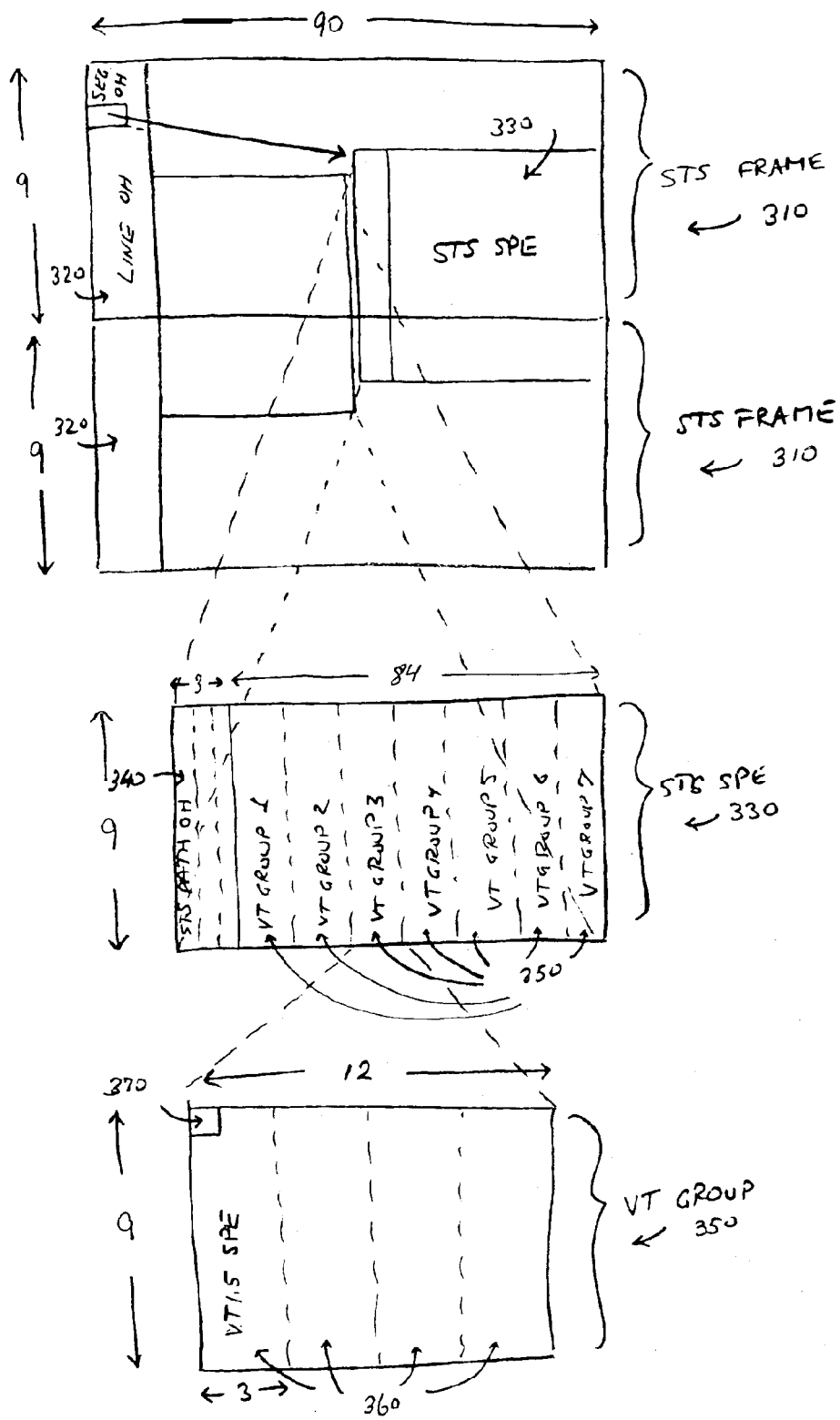
FIG. 3 is a diagram illustrating a SONET STS-1 frame which multiplexes signals from multiple virtual tributaries.
Figure 4:
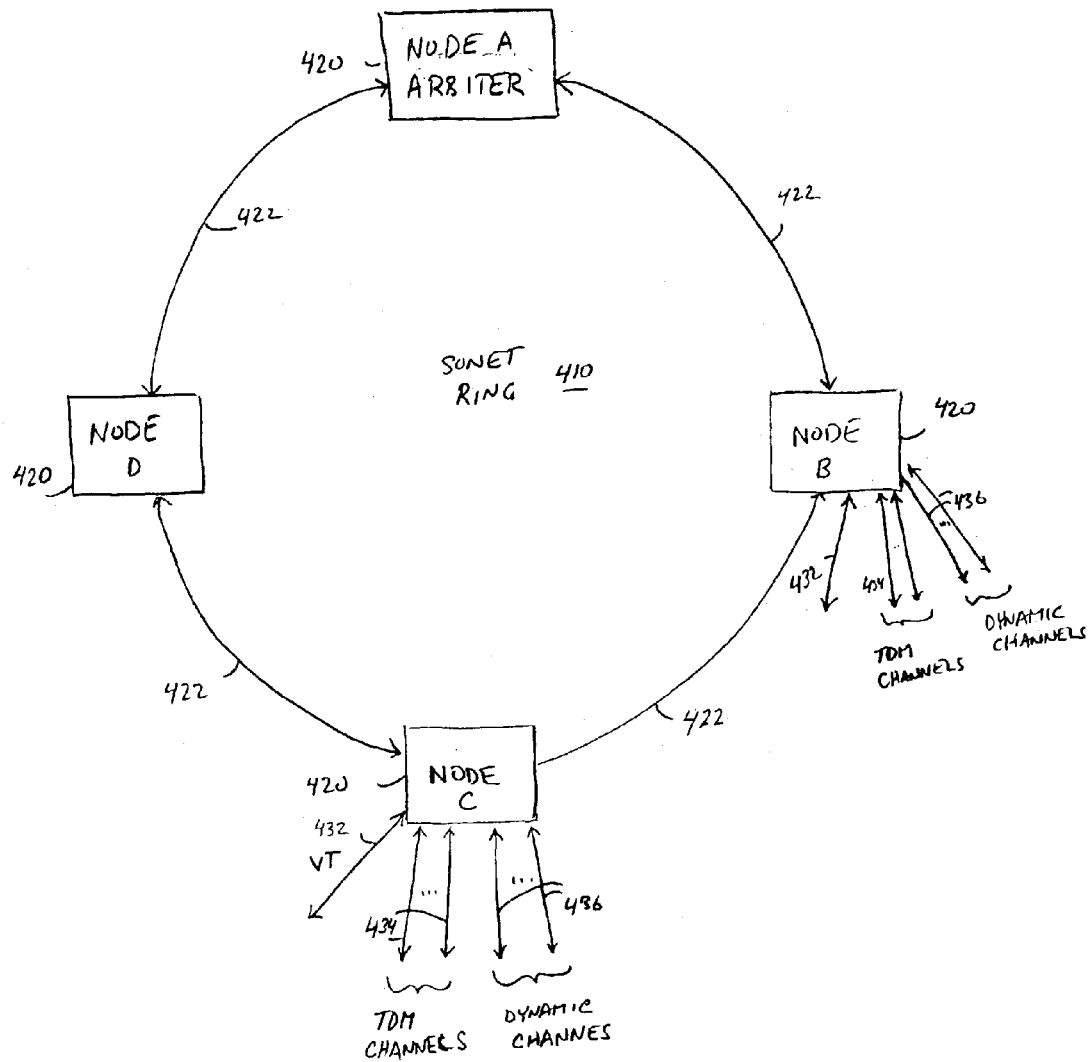
FIG. 4 is a block diagram of a SONET ring in which bandwidth is dynamically managed by an arbiter on the ring.

Referring to FIG. 4, in one embodiment, a number of SONET nodes 420 (labeled A–D) are coupled over optical links 422 in a SONET ring 410. Optical links 422 carry signals according to a standard framing format, in this embodiment according to STS-1 framing using OC-1 signaling (see STS-1 block 250 and OC-1 block 280 shown in FIG. 2). In alternative embodiments, optical links 422 may carry signals at a higher standard rate, for example using STS-3 framing with OC-3 signaling, or STS-12 framing with OC-12 signaling. The following description focuses on STS-1 of STS-3 payloads, however, the approach is applicable to all SONET rates. In FIG. 4, SONET ring 410 is a UPSR (unidirectional path switched ring), in which all communication between nodes travels in one direction. In alternative embodiments, other types of rings, such as a BLSR (bi-directional line switched ring) in which communication between nodes on the ring travels in both clockwise and counterclockwise directions, are used.

In addition to passing data over standard rate virtual tributaries 432 between nodes 420, in accordance with the invention, SONET ring 410 passes data over TDM (isochronous time division multiplexed) channels 434 and dynamic channels 436 between nodes. TDM channels 434 and dynamic channels 436 are not limited to rates in the SONET signal hierarchy shown in FIG. 2. For example, TDM channels 434 may have rates lower than the 1.5 Mb/s of a VT1.5 virtual tributary. In particular, a TDM channel may use as little as a single STS-1 column yielding a data rate of 576 Kb/s. Dynamic channels 436 can be repeatedly assigned to communication between different nodes after SONET ring 410 is provisioned, and furthermore, the data rate assigned to any particular dynamic channel 436 can be dynamically changed, for example to accommodate time-varying data rate requirements of bursty communication between nodes.

In this embodiment, TDM channels 434 and dynamic channels 436 coexist with standard VT traffic by together using a portion of the frames sent between nodes 420 that would otherwise be used to send one or more standard virtual tributaries. For example, the TDM and dynamic channels together can use a single VT group in an STS-1 frame, thereby coexisting with other VT groups in the frame, and with other STS-1 frames if the STS-1 frames are multiplexed into STS-3 or higher rate frames. Alternatively, the TDM and dynamic channels can use an entire SPE of an STS-1 frame, or a full SPE-3 of a STS-3 frame. In alternative embodiments, all or some of nodes 420 can be dedicated to use TDM channels 434, dynamic channels 436, or to a mix of TDM and dynamic channels.

In order to dynamically manage the TDM and dynamic channels, one node 420 is assigned to be the arbiter node at the time the ring is provisioned. The remaining nodes that make use of the TDM and dynamic channels are client nodes. In FIG. 4, node A is the arbiter node and the remaining nodes are client nodes. Requests to assign dynamic channels for communication between particular nodes are sent from a client nodes to the arbiter. The arbiter responds to the requests by assigning dynamic channels to particular nodes, and by adjusting the allocated rates for the dynamic channels.

Figure 5A:
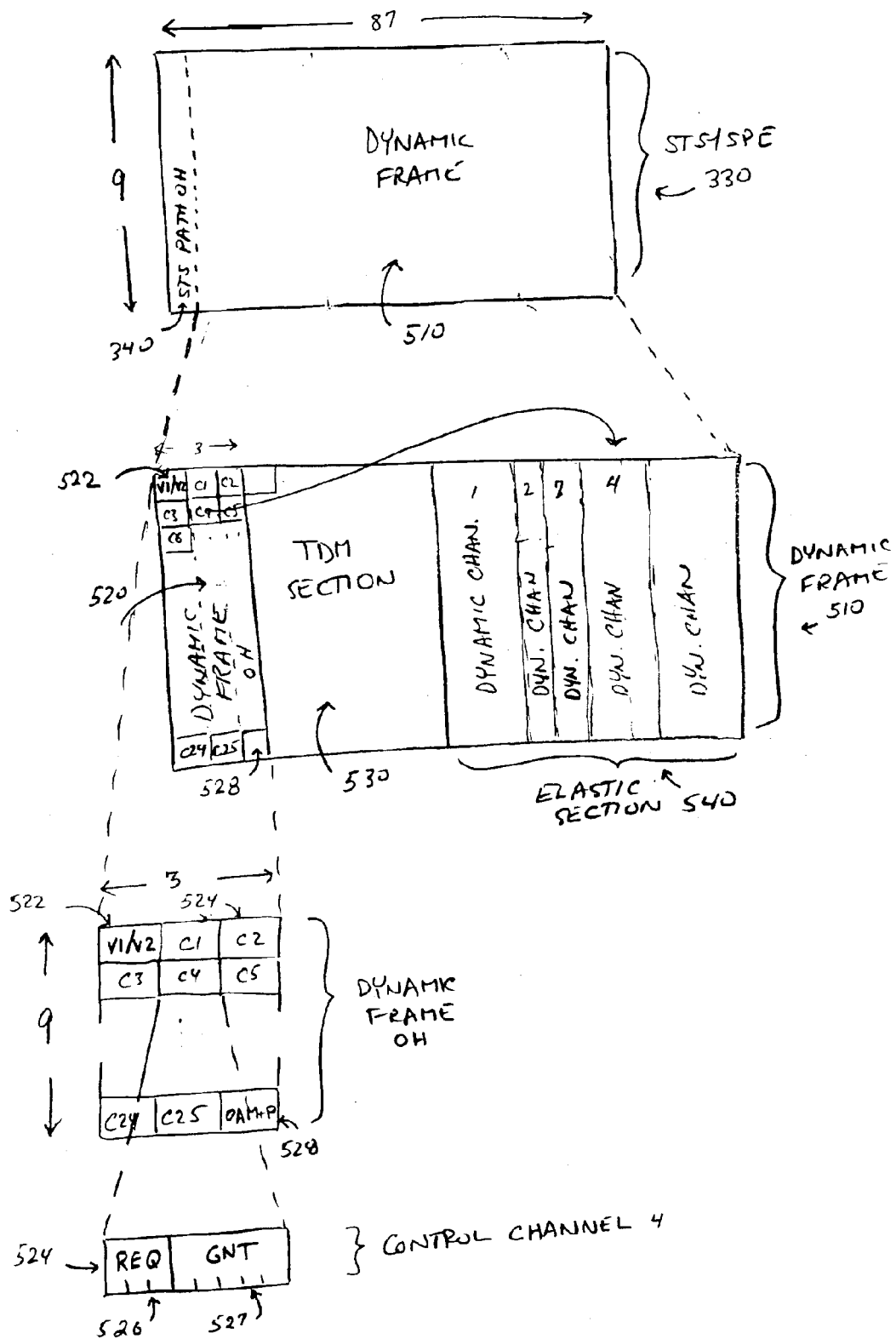
FIG. 5A is a diagram illustrating a SONET STS-1 frame which includes sections that are dynamically managed.
Figure 5B:
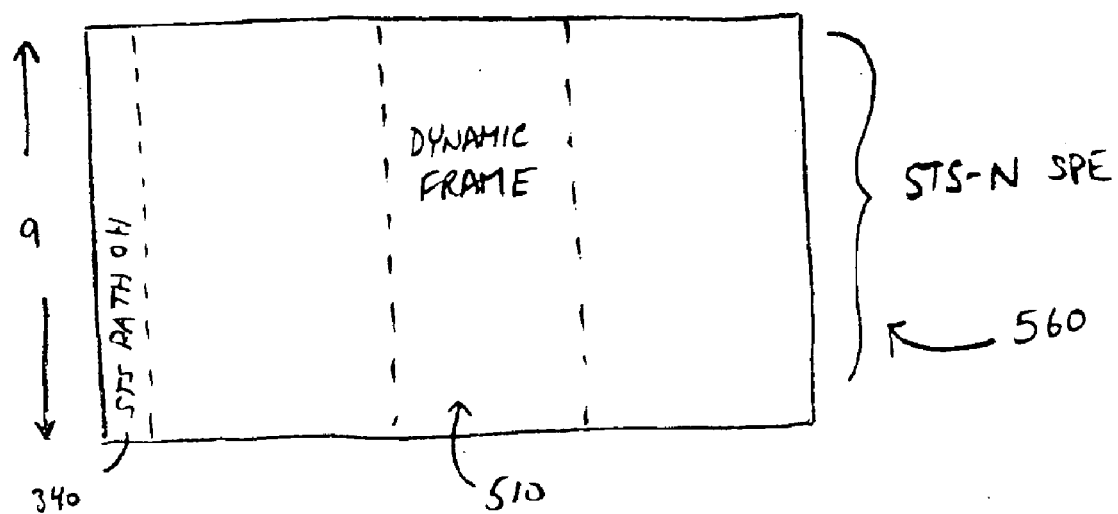
FIG. 5B is a diagram illustrating a SONET STS-N frame which includes sections that are dynamically managed.

Referring to FIG. 5A, TDM channels 434 and dynamic channels 436 (FIG. 4) use the standard STS-N framing structure. As shown in FIG. 5, in this embodiment an entire STS-1 SPE (synchronous payload envelop) 330, except for a single column used for STS path overhead 340, is used for a dynamic frame 530. Dynamic frame 530 includes TDM and dynamic channels and their associated overhead. As outlined above, in alternative embodiments, larger STS-N frames are used to carry the TDM and dynamic channels. As shown in FIG. 5B, in these alternative embodiments, dynamic frame 530 can use less than a full STS-N SPE 560. In general, dynamic frame 530 uses less than a full STS-1 SPE or STS-N SPE, for instance using one or more VT groups of 12 columns each. However, as the dynamic frame decreases in size, the minimum faction of the dynamic frame devoted to overhead increases. If the dynamic frame is only 12 columns in size, then overhead amounts to at least $\frac{1}{12}$, or almost 10%, of the dynamic frame.

In FIGS. 5A and 5B, segments of an STS frame are shown logically as contiguous columns. In general, columns of various sections are physically interleaved. For example, the columns of TDM channels may be evenly distributed throughout the frame.

In FIG. 5A, STS-1 SPE 330 includes a dynamic frame 510, which is used to carry the TDM and dynamic channels. Using a standard portion of the STS SPE frame maintains compatibility with standard SONET equipment. For example, not all nodes 420 on SONET ring 410 (FIG. 4) need to recognize the internal structure of dynamic frame 510; only nodes that terminate particular channels in the dynamic frame, and the arbiter node, need to recognize the structure. For example, in an STS-12 SONET frame, a particular STS-3 could be dynamically managed as described in the current invention, while other STS-3c could contain ATM traffic or traditional VT traffic.

Referring still to FIG. 5A, dynamic frame 510 includes three sections. A dynamic frame overhead section 520, in this embodiment made up of three columns, is used to transport dynamic bandwidth management information between nodes 420 and the arbiter node. For instance, requests for bandwidth from client nodes and responses from the arbiter node pass in dynamic frame overhead section 520. In alternative embodiments, the byte positions of these sections and fields within the sections may differ.

A second section, TDM section 530, is used for statically configured isochronous circuits between nodes. In one alternative, TDM section 530 is reserved for traditional virtual tributary multiplexing, with the minimum granularity of one VT1.5. In another alternative, TDM section 530 includes circuits that are allocated in units of one column. In either alternative, the number of columns for TDM traffic is determined by static provisioning of the fixed-rate channels.

A third section, elastic section 540, carries channels that are dynamically allocated and that typically carry bursty data, therefore benefiting from dynamic allocation of their rates to accommodate variations in their rate. Elastic section 540 is provisioned to include a fixed number of dynamic channels. At any time, each dynamic channel is allocated zero or more columns of elastic section 540, and is used for communication between two or more nodes 420. Each of the dynamic channels is associated with a particular control channel in dynamic frame overhead section 520.

The frame overhead section includes bytes reserved to carry VT related information, for the various TDM channels that are carried within the frame. An OAM&P channel 528, the last byte of dynamic frame overhead section 520, is reserved for OAM&P messaging. Requests and responses for assignment of particular dynamic channels for communication between particular pairs of nodes are passed over the OAM&P messaging channel. Control channels 524 are used to pass requests to modify the capacity of assigned channels from various nodes to the arbiter node, and indications of the assigned capacity for each dynamics channel from the arbiter to the nodes. One control channel 524 is associated with each dynamic channel in elastic section 540. The portion of dynamic frame overhead 520 between VT overhead byte 522 and OAM&P channel 528 holds the sequence of equally-sized control channels 524. In this embodiment, each control channel 524 is 8 bits in size, thereby providing control channels for a maximum of 25=3*9−2 bursty channels in a three-column by nine-row overhead section 520. In alternative embodiments, a different number of bits per control channel can be used. For example, 6 bit control channels provide for 33 bursty channels in the three overhead columns. Also, in other embodiments, for example in which larger STS-N frames are used, dynamic frame overhead section 520 uses additional columns to accommodate more control channels.

Referring still to FIG. 5A, each control channel 524 includes two sections, a request section (REQ) 526 and a grant section (GNT) 527. REQ 526 is set by a client node 420 (FIG. 4) to request additional bandwidth for the corresponding bursty channel from the arbiter. GNT 527 is set by the arbiter node to grant bandwidth to the requested channel. The values in REQ and GNT are encoded thereby reducing the number of bits needed for the control channel. In this embodiment, in which control channel 524 is 8 bits, REQ 526 is 3 bits and GNT 527 is 5 bits, the values of REQ and GNT are encoded as follows:

| REQ | Requested Bandwidth |
| --- | --- |
| 000 | No bandwidth required |
| 001 | Deallocate 1 column |
| 010 | Deallocate 3 columns |
| 011 | Deallocate 6 columns |
| 100 | Allocate 1 additional column |
| 101 | Allocate 3 additional columns |
| 110 | Allocate 6 additional columns |
| 111 | Allocate 10 additional columns |

| GNT | Granted Bandwidth |
| --- | --- |
| 00000 | No Bandwidth allocated |
| 00001 | Numerical value of the number |
| –11110 | of columns allocated |
| 11111 | All available columns allocated to the channel |

Alternative embodiments use different encodings of REQ and GNT and may allocate different members of bits to these fields.

Figure 7:
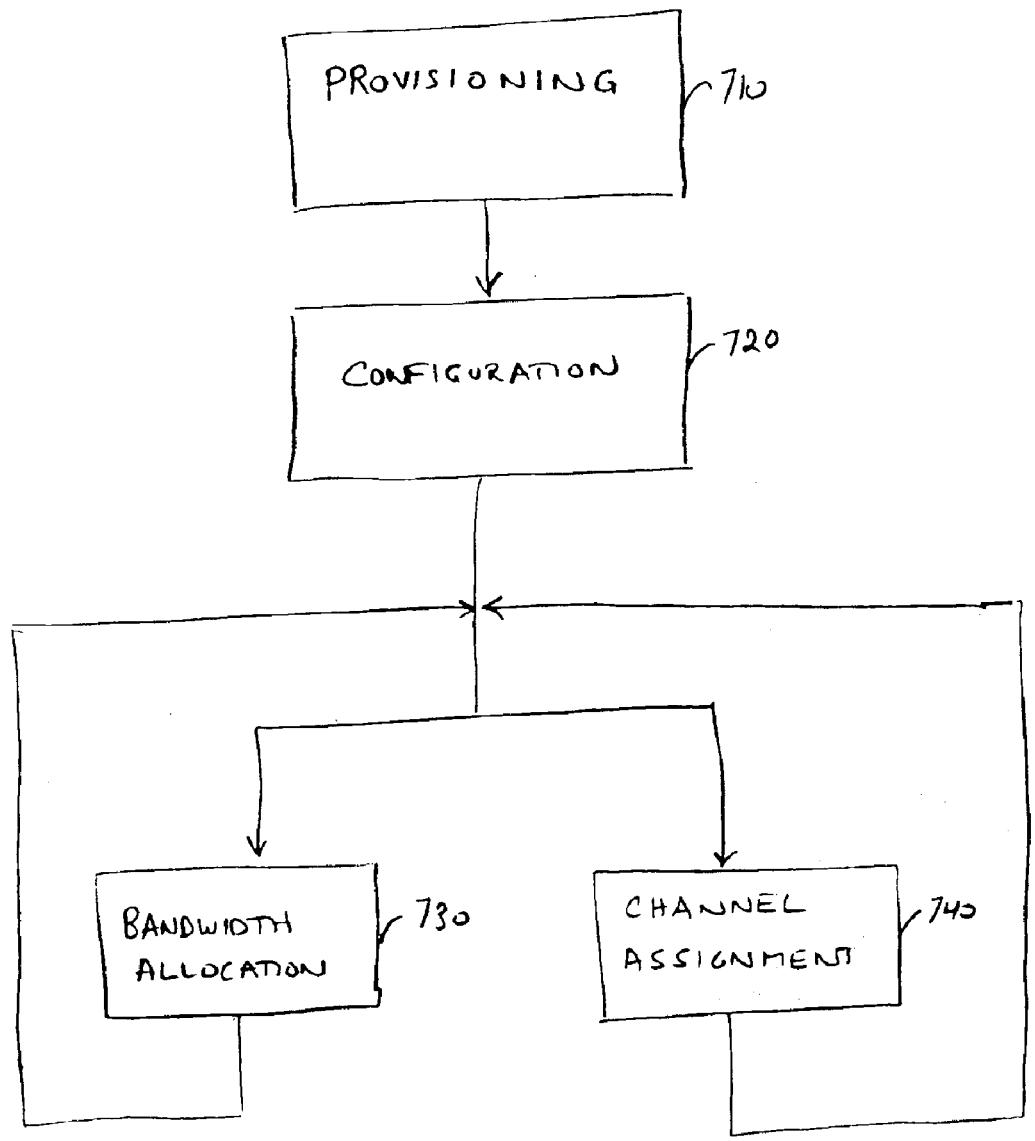
FIG. 7 is a flowchart of overall operation of the system.

Referring to FIG. 7, operation of the system proceeds through several steps. First, SONET ring 410 is provisioned using standard SONET provisioning techniques (step 710). At the end of this step, each node 420 is able to identify dynamic frame 520 in the STS frames that it receives. Next, a configuration step is carried out in which the node ids of the nodes which are participating in the communication using the dynamic frames are determined, and other initial configuration of the TDM and dynamic channels takes place (step 720). After the configuration step is completed, nodes can communicate over TDM and dynamic channels that were set up in the configuration step. In operation, from time to time, nodes may initiate a bandwidth allocation step in which the bandwidth allocated to an existing channel is requested to be changed (step 730), or a channel assignment step in which a channel is assigned to communication among particular nodes, or an existing channel is released if it is no longer needed (step 740).

Figure 8:
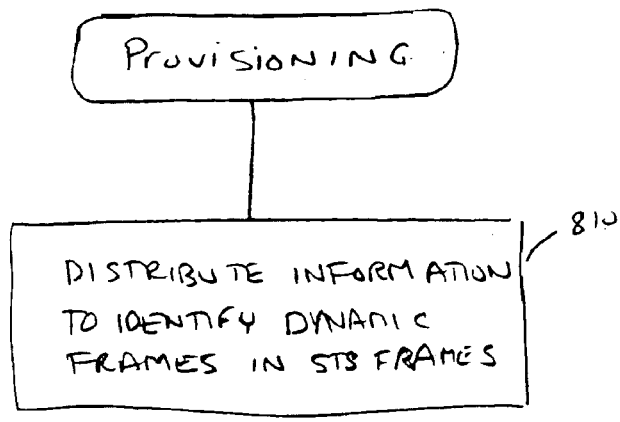
FIG. 8 is a flowchart of the provisioning step.

Referring to FIG. 8, during the provisioning of SONET ring 410, each node 420 receives the information it needed to identify the dynamic frame 520 in each of the STS frames that it receives (step 810). This information is sent to the nodes using standard SONET provisioning techniques, for example by passing control information in the SONET Data Communication Channel (DCC) to each of the nodes from a centralized provisioning node.

Figure 9:
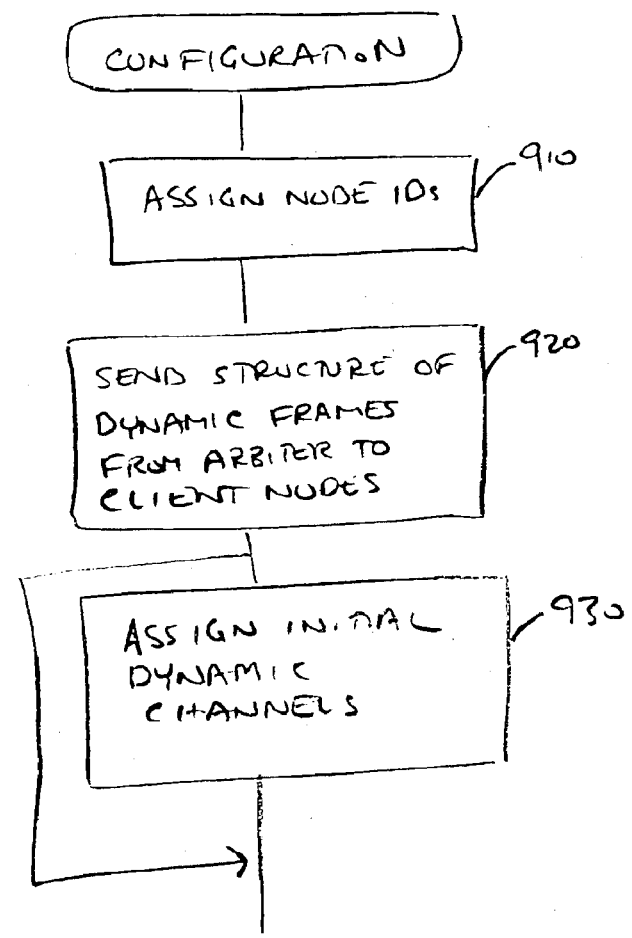
FIG. 9 is a flowchart of the configuration step.

Referring to FIG. 9, once each node is able to identify the dynamic frame in STS frames arriving at that node, the nodes begin configuration step 720. During this step, the nodes exchange messages over OAM&P channel 528 and control channels 524. First, each node 420 determines its node ID, which is a unique numerical identifier on SONET ring 410 for that node (step 910). At the initiation of this step, the arbiter node has already been selected, for instance during or prior to provisioning of the ring. The node ID is assigned in sequence beginning at 1 for the arbiter node, and incremented in sequence for nodes as the ring is traversed in a predetermined direction. In this embodiment, the arbiter node sends a ID assignment message over OAM&P channel 528 to its neighboring node. The neighboring node receives the message and assigns its node ID. That neighboring node then increments the ID in the message and forwards the message to its neighbor. This continues until the entire ring is traversed and the arbiter node receives the ID assignment message from the last node. In this embodiment, SONET ring 410 is traversed in the direction of the working channels. In alternative embodiments which make use of a bi-directional ring, by convention, the ring is traversed in the clockwise direction. Alternative embodiments may use other approaches to assigning unique identifiers to the nodes. For instance, the IDs may be assigned prior to or during the provisioning phase.

In the next step of configuration, the arbiter node sends information related to the structure of the dynamic frames to the client nodes over OAM&P channel 528 (step 920). This information includes the size of dynamic frame overhead section 520 (see FIG. 5), the number of dynamic channels, and the size of each control channel 524. The arbiter also sends static information related to TDM channels 434, including the number of TDM channels, their allocated rates, and the terminal nodes of the channels. Note that TDM channels, as well as the dynamic channels may have more than two terminal nodes, for example if the channel is used for broadcast communication. The static information related to the TDM channels includes the size of TDM section 530, or sufficient information for each node to compute the size from the number and sizes of the TDM channels. The space remaining in dynamic frame 510 is used for elastic section 540.

In a next, optional, step of configuration, the arbiter node assigns a number of dynamic channels 436 to couple particular nodes (step 930). This involves the arbiter node notifying each node of the dynamic channel which it terminates, and providing the initial data rate allocations for each of the dynamic channels. The allocations are in units of columns of the dynamic frame. Note that certain dynamic channels initially may be allocated no capacity (zero columns). The client nodes 420 compute the starting column for the dynamic channels by determining the end of TDM section 530, and then summing the allocated number of columns for all other dynamic channels that have lower identifying numbers to determine the start of that channel's allocation relative to the end of the TDM section.

Referring back to FIG. 7, after provisioning (step 710) and configuration (step 720), each node knows which TDM and dynamic channels terminate at that node, and what portion of the dynamic frame is allocated to each of those channels.

In operation, each node 420 functions as an add/drop multiplexer for the TDM and dynamic channels. That is, the node extracts data for TDM and dynamic channels that terminate at the node, and multiplexes outbound data onto the ring for those channels. Based on the configuration information received by the nodes, each node is aware of which TDM and dynamic channels are added/dropped at that node.

Figure 10:
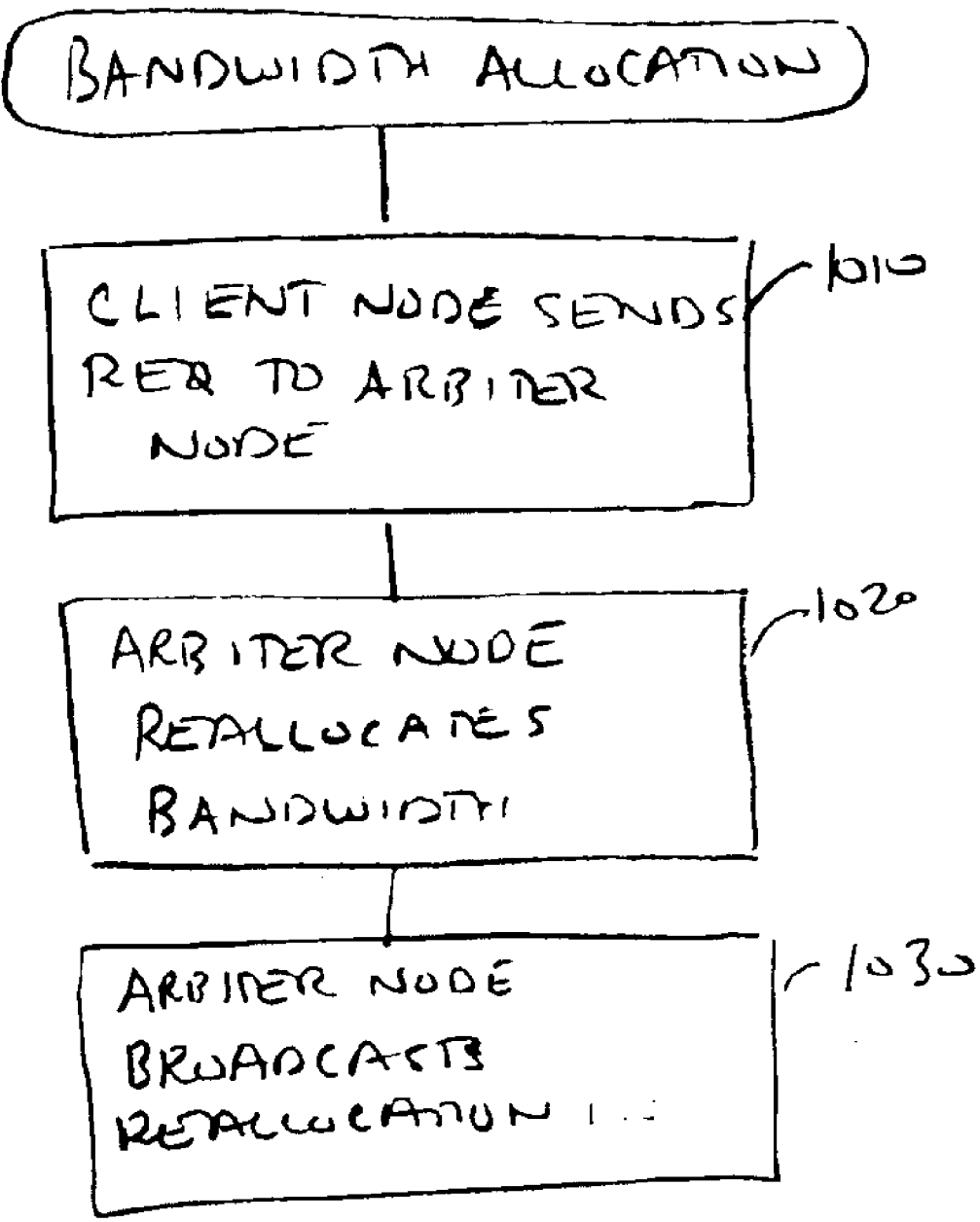
FIG. 10 is a flowchart of the bandwidth allocation step.

During operation, bandwidths of previously assigned channels may be reallocated (step 730). Referring to FIG. 10, a client node request bandwidth for a particular dynamic channel by setting the appropriate value in REQ 526 of the control channel 524 (FIG. 5A) associated with the dynamic channel (step 1010). The frame with the REQ value passes from the client node to the arbiter node, which extracts the REQ value. The arbiter node then determines how to increase or decrease the allocations to one or more dynamic channels to accommodate the request (step 1020). The arbiter node then indicates the changes in allocations in the values of GNT 527 of the corresponding control channels 524 and broadcasts the change by sending a frame containing the GNT values around the ring, thereby broadcasting the change to all the other nodes (step 1030). For example, a client node may request an increase in one column for dynamic channel J. In response, the arbiter may increase the allocation for channel J by 1 and concurrently reduce the allocation for some other dynamic channel I by 1. In this way, if elastic section 540 was full allocated, the full allocation is maintained while transferring one column of allocation to channel J from channel I.

A request to increase the allocated bandwidth to a channel may be made by any of the nodes which terminate (i.e., which add/drop) the channel. The requesting node sets the REQ bits for the appropriate control channel and sends the dynamic frame holding the REQ bits toward the arbiter. Depending on the position of the requesting node on the ring, another node that terminates the channel may see the request before it reaches the arbiter, and can modify the REQ bits. As a rule, a node intercepting a REQ to change bandwidth may modify the REQ to increase the request (or to reduce the amount by which a bandwidth reduction is requested), but does not reduce a request for bandwidth. In this way, only the node closest to the arbiter can request to reduce the bandwidth for a channel without some other node, terminating that channel having an opportunity to change or nullify the request.

Each channel is associated with a set of two or more node IDs, corresponding to the nodes which terminate that channel. The nodes that terminate a particular channel may in fact use that channel to pass data for a set of sub-channels. Nodes which do not add or drop that channel are in general not aware of the number of sub-channels, or how those sub-channels are multiplexed onto the channel. In this way, the number of channels needed is related to the number of unique sets of terminal nodes, not to an underlying number of communication sessions passing between nodes.

The arbiter maintains a database of all active TDM and dynamic channels. In particular, for each dynamic channel, the arbiter maintains a list of all terminal nodes for that channel, as well as the current allocation for that channel.

Dynamic channels are each associated with a priority. These priorities are used by the arbiter in reassigning rates to the dynamic channels when servicing requests to increase or decrease the allocation for a channel. For each set of nodes which terminate a particular channel, a list of priorities are maintained. Each priority is assigned a unique channel number.

Referring back to FIG. 7, in addition to requesting a change in bandwidth for a dynamic channel using the REQ bits of a control channel (step 730), a node may also send a request to the arbiter to establish a new communication channel with one or more other nodes. In addition to identifying the set of nodes which are to terminate the session, the request identifies a priority for the session. As will be seen below, that request does not necessarily result in allocating a new dynamic channel to that session.

Figure 11:
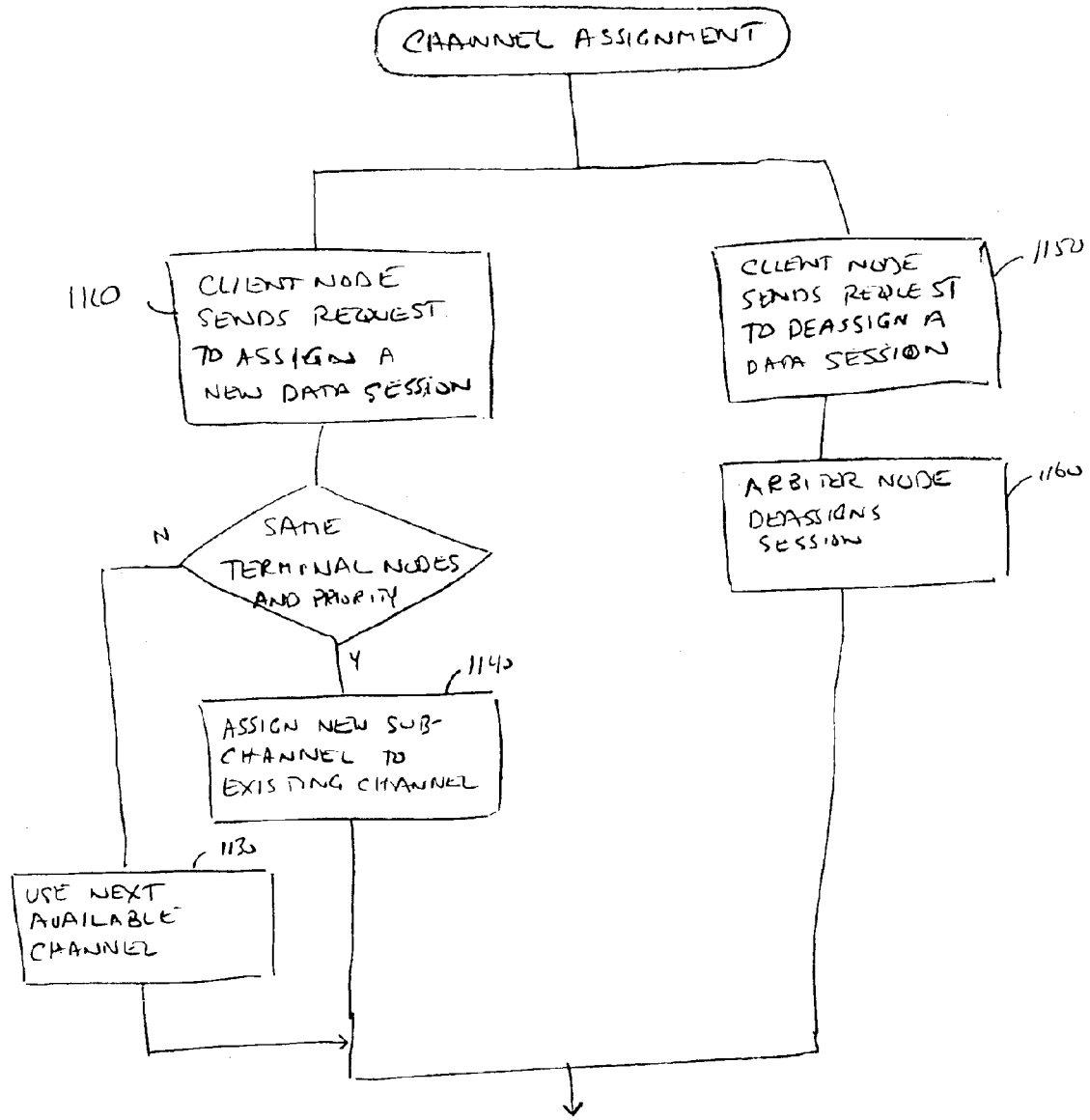
FIG. 11 is a flowchart of the channel assignment step.

Referring to FIG. 11, the requesting node communicates a request to establish a new communication session to the arbiter over the OAM&P channel (step 1110). The request identifies the terminal nodes of the session and the priority of the session. The arbiter node receives the request and first determines whether the request has the same terminal nodes and priority as an already assigned dynamic channel (step 1120). If it does not, the arbiter node picks the next available channel number that is not currently assigned to a communication session and assigns sub-channel number of 0 to the new stream and communicates the assignment to the requesting node over the OAM&P channel (step 1130). If the requested terminal nodes and priority are the same as an already assigned dynamic channel, the arbiter node assigns a new sub-channel number to the new stream and communicates the assignment to the requesting node over the OAM&P channel (step 1140). The sub-channel number is not "visible" on the ring, and is only communicated to the terminating nodes in order for them to correctly multiplex and demultiplex traffic streams on separate sub-channels on a common dynamic channel.

A node can also request that a communication stream that was previously assigned to a dynamic channel be deassigned (step 1150). The arbiter node either deassigns the sub-channel for that steam (step 1160). If there are no remaining sub-channels on that dynamic channel, may subsequently reuse the dynamic channel for a request involving different terminal nodes and priority.

Once the communication session is assigned to a dynamic channel, the nodes can increase or decrease the bandwidth allocation for the assigned channel using the REQ/GNT approach described above (step 730).

Figure 6:
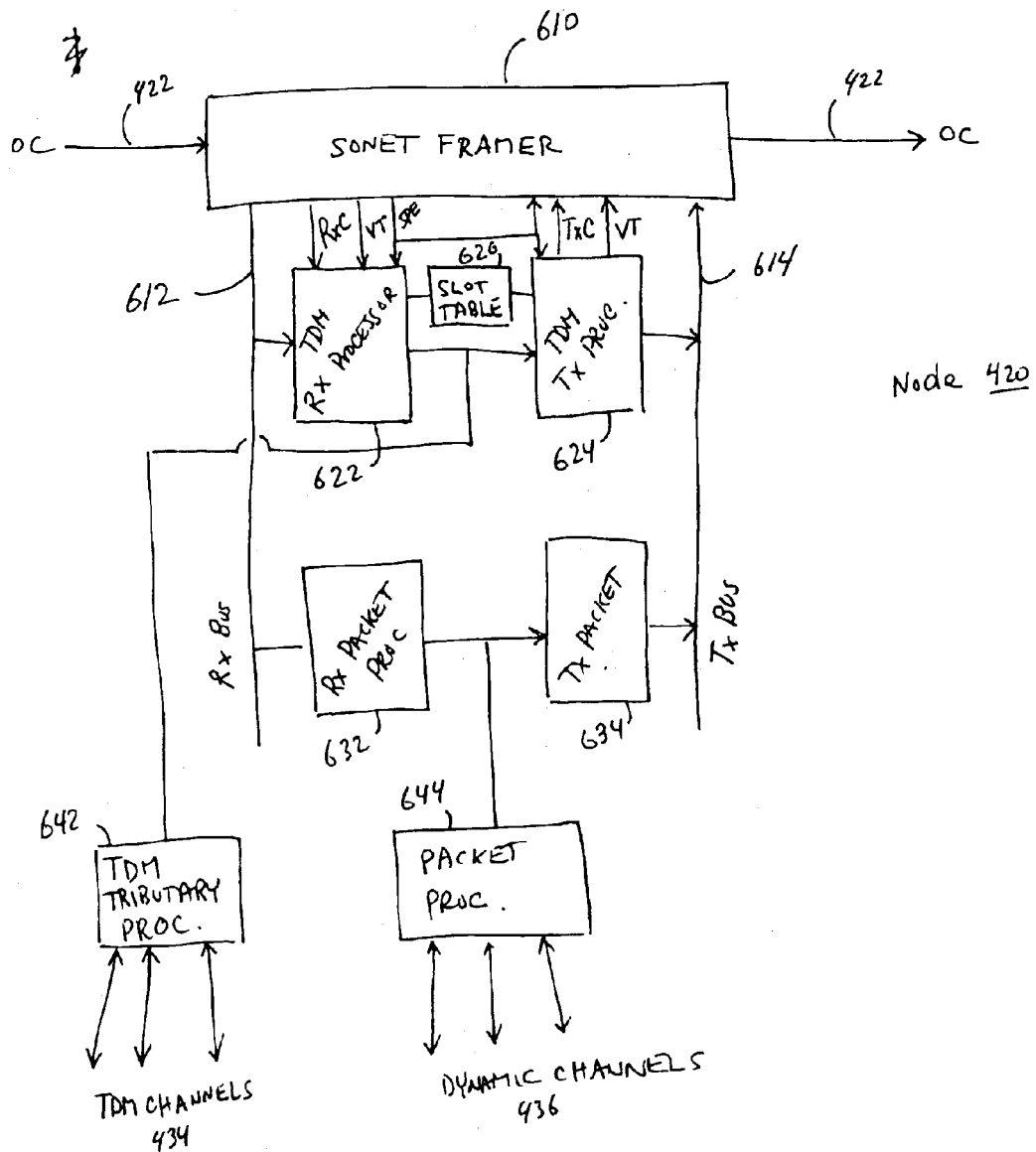
FIG. 6 is a block diagram illustrating components of a node.

Referring to FIG. 6, a SONET node 420 (FIG. 4), according to the invention, includes several components. A SONET framer 610 is coupled to optical links 422, which couple the node to its neighboring nodes. SONET framer 610 performs synchronous byte multiplexing/demultiplexing into 125 microsecond STS-1 frames as dictated by the SONET/SDH standards. SONET framer 610 extracts the receive clock (RxC) and performs SONET/SDH overhead processing (Section/Line Overhead) for the received frames. The SONET framer extracts the Synchronous Payload Envelope (SPE) and places the SPE byte stream on a Rx bus 612. SONET framer 610 also generates a SPE Start signal in order to trigger the back end circuitry to process the payload portion of the byte stream on Rx bus 612. SONET framer 610 also computes the VT pointer and generates a VT Start signal to trigger processing of the incoming Virtual Tributaries.

The back-end circuitry includes a TDM Receive (Rx) processor 622 and a TDM transmit (Tx) processor 624. A slot table 626 holds data identifying the positions of the TDM channels that are added/dropped at this node. TDM Rx processor 622 passes the TDM channels to TDM Tx processor, as well as a TDM tributary processor 642. TDM tributary processor 642 provides an interface to TDM channels 434. TDM Tx processor 624 multiplexes the TDM channels that pass through the node (i.e., that are not added/dropped at the node) and TDM channels that are passed from TDM tributary processor 642. The multiplexed TDM data is passed to Tx bus 614 and then to SONET framer 610 where it is multiplexed onto the outbound optical link. Dynamic channel data is passed from Rx bus 612 to an Rx packet processor 632, which extracts the elastics section of the frame. Rx packet processor 632 passes the channels that terminate at the node to a packet processor 644 which provides an interface to dynamic channels 436. Packet processor 644 includes buffers and other mechanisms to implement appropriate queuing, scheduling and policing processes necessary to handle incoming and outgoing packet traffic. A Tx packet processor 634 multiplexes dynamic channels that are not added/dropped at this node and dynamic channels that are passed from packet processor 644 onto Tx bus 614, and then to SONET framer 610 where it is multiplexed onto the outbound optical link.

Alternative embodiments use the described approach in other types of networks. For example, electrical rather than optical communication paths can couple the nodes. Also, a ring architecture is not needed to make use of the approach. For example, a similar approach to passing dynamic channels in standard rate frames can be used in a branching signal distribution architecture. Also, although the description above is in the context of standard SONET frames (e.g., STS-1, STS-3c, etc.) the approach is directly applicable to passing bursty communication in other fixed rate multiplexing systems.

It is to be understood that while the invention has been described in conjunction with the detailed description thereof, the foregoing description is intended only to illustrate particular embodiments of the invention and not limit the scope of the invention, which is defined by the scope of the appended claims. Other aspects, advantages, and modifications are within the scope of the following claims.

What is claimed is:

1. A method for communicating between a plurality of nodes of a communication system in which a series of fixed-length frames pass between the nodes of the system comprising:

provisioning the communication system, including allocating in each frame a fixed part, said fixed part including a first part of the frame for passing control information between the nodes, a second part for passing data streams over a plurality of dynamically allocated channels between the nodes, and a third part that is allocated for fixed-rate channels between the nodes;

at a first node in the system,
- (1) receiving a communication request for a dynamically allocated channel between a second node and a third node including receiving request data from the second node in the first part of a received frame,
- (2) allocating a portion of the second part of the frames to said dynamically allocated channel, and
- (3) broadcasting a response to the request including transmitting control data in the first part of a frame; and at the second node,
- (1) receiving the control data transmitted by the first node,
- (2) determining the portion of the second part of each of the frames that is allocated to said dynamically allocated channel, and
- (3) sending a data over said dynamically allocated channel to the third node, including passing data in said portion of the second part of each of a series of frames.

2. The method of claim 1 wherein receiving the request for the dynamically allocated channel between the second node and the third node includes receiving a request to change an allocated capacity of a communication channel.

3. The method of claim 1 wherein receiving the request for the dynamically allocated channel includes receiving a priority for said channel.

4. The method of claim 2 wherein allocating the portion of the second part of the frames to said communication channel includes modifying allocated capacities of multiple communication channels.

5. The method of claim 1 wherein the communication system includes a synchronous communication network and each frame includes a fixed length payload, and wherein allocating the fixed part of each frame includes allocating a portion of the fixed length payload of each frame.

6. The method of claim 5 wherein the synchronous communication network includes a SONET/SDH network, and a Synchronous Payload Envelope (SPE) of each frame comprises the fixed length payload.

7. The method of claim 6 wherein the portion of the fixed length payload comprises the entire SPE.

8. The method of claim 6 wherein the portion of the fixed length payload includes a virtual tributary group.

9. The method of claim 6 wherein provisioning the communication system further includes allocating a portion of the SPE to conventional SONET/SDH virtual tributaries, whereby a portion of the communication capacity of the SONET/SDH network is used for conventional communication on statically allocated virtual paths.

10. The method of claim 6 wherein the portion of the SPE includes a virtual tributary.

11. The method of claim 1 wherein the first part of each frame is for passing control information that includes requests for dynamically allocated channels from a plurality of nodes of the system.

12. The method of claim 1 wherein the control data that is broadcast in the part of each frame is for passing data specifying portions of each frame associated with each of a plurality of dynamically allocation channels.

13. The method of claim 12 wherein data specifying portions of each frame includes offset data of said portions within the frame.

14. The method of claim 13 wherein data specifying portions of each frame includes sizes of the data of said portions within the frame.

15. The method of claim 12 wherein sending the data stream over the dynamically allocated channel from the second node to the third node includes accessing the data specifying the portion of the frame associated with said dynamic channel.

16. The method of claim 15 wherein sending the data stream includes adding data to the frame according to the data specifying the portion of the frame associated with the dynamic channel.

17. The method of claim 1 wherein receiving the request for the dynamically allocated channel between the second node and the third node includes receiving a request to assign a communication session for passing a data stream between the second node and the third node.

18. The method of claim 17 further comprising receiving a request for altering a capacity of a dynamically allocated channel between the second node and the third node, said request being sent from the second node and received at the third node.

19. The method of claim 18 further comprising, at the third node, modifying the request and forwarding the modified request to the first node.

20. The method of claim 19 wherein modifying the request is performed according to communication capacity required for communication from the third node to the second node.

21. The method of claim 1 wherein the third part in the fixed part remains at a constant location in the fixed part independent of locations of dynamically allocated channels.

22. The method of claim 1 wherein the third part includes a plurality of separated portions within the fixed part.

23. The method of claim 1 wherein the first part of the frame and the second part of the frame are each integral numbers of columns of an SPE.

24. The method of claim 23 wherein allocating a portion of the second part of the frames includes allocating an integral number of nine-byte columns of an SPE.

* * * * *